US009323849B2

(12) United States Patent
Cotter et al.

(10) Patent No.: US 9,323,849 B2
(45) Date of Patent: *Apr. 26, 2016

(54) PERSONALISING CONTENT PROVIDED TO A USER

(75) Inventors: Paul Cotter, Dublin (IE); Barry Joseph Smyth, County Wicklow (IE); Nigel David Hanby, Dublin (IE)

(73) Assignee: Amdocs Software Systems Limited, Dublin (IE)

( * ) Notice: Subject to any disclaimer, the term of this patent is extended or adjusted under 35 U.S.C. 154(b) by 905 days.

This patent is subject to a terminal disclaimer.

(21) Appl. No.: 13/162,531

(22) Filed: Jun. 16, 2011

(65) Prior Publication Data

US 2011/0252297 A1 Oct. 13, 2011

Related U.S. Application Data

(63) Continuation of application No. 10/536,297, filed as application No. PCT/IE03/00153 on Nov. 12, 2003, now Pat. No. 7,987,426.

(30) Foreign Application Priority Data

Nov. 27, 2002 (IE) .................................. S2002/0908

(51) Int. Cl.
| | |
|---|---|
| G06F 3/00 | (2006.01) |
| G06F 3/048 | (2013.01) |
| G06F 15/16 | (2006.01) |
| G06Q 30/00 | (2012.01) |
| G06F 7/00 | (2006.01) |
| G06F 17/30 | (2006.01) |

(52) U.S. Cl.
CPC .............................. *G06F 17/30867* (2013.01)

(58) Field of Classification Search
CPC ....... G06F 9/4443; G06F 3/048; G06F 15/16; G06F 3/00; G06F 17/60; G06F 7/00; G06Q 30/00
USPC .......................................................... 715/744
See application file for complete search history.

(56) References Cited

U.S. PATENT DOCUMENTS

| | | | | |
|---|---|---|---|---|
| 6,466,918 | B1 * | 10/2002 | Spiegel et al. | 705/7.29 |
| 6,823,312 | B2 * | 11/2004 | Mittal et al. | 704/271 |
| 7,295,995 | B1 * | 11/2007 | York et al. | 705/26.8 |
| 2002/0024536 | A1 * | 2/2002 | Kahan et al. | 345/745 |
| 2002/0059586 | A1 * | 5/2002 | Carney et al. | 725/35 |
| 2002/0059588 | A1 * | 5/2002 | Huber et al. | 725/35 |
| 2002/0087525 | A1 * | 7/2002 | Abbott et al. | 707/3 |
| 2002/0108114 | A1 * | 8/2002 | Shinohara et al. | 725/46 |
| 2002/0147766 | A1 * | 10/2002 | Vanska et al. | 709/203 |
| 2002/0174230 | A1 * | 11/2002 | Gudorf et al. | 709/227 |
| 2002/0194586 | A1 * | 12/2002 | Gutta et al. | 725/10 |

(Continued)

*Primary Examiner* — Jennifer To
*Assistant Examiner* — Hugo Molina
(74) *Attorney, Agent, or Firm* — Zilka-Kotab, PC

(57) ABSTRACT

Content such as user interface items provided to a user during a session of an interactive application is personalized. One or more environmental context attribute values for the session are determined. Responsive to a request for content, for at least one item of the content, each of the environmental context attribute values are mapped to respective values indicating a users level of interest in the item for the environmental context attribute values. Content is retrieved from a content database and the content is personalized as a function of the users level of interest in the item for the environmental context attribute values before being returned to the application.

10 Claims, 4 Drawing Sheets

(56) References Cited

U.S. PATENT DOCUMENTS

2002/0198882 A1* 12/2002 Linden et al. .................. 707/10
2003/0028871 A1* 2/2003 Wang et al. ...................... 725/9
2003/0105682 A1* 6/2003 Dicker et al. .................. 705/27
2004/0043758 A1* 3/2004 Sorvari et al. ............. 455/414.1

* cited by examiner

Personality Information

Attribute #1

| Item | Hit-Table | | | | |
|---|---|---|---|---|---|
| | V1 | V2 | V3 | ... | Vn |
| News | 3 | 0 | 5 | 7 | 2 |
| Sport | | | | | |

Attribute #2

| Item | Hit-Table | | | |
|---|---|---|---|---|
| | V1 | V2 | ... | Vm |
| News | | | | |
| Sport | | | | |

Attribute #3

| Item | Hit-Table | |
|---|---|---|
| | V1 | V2 |
| News | | |
| Sport | | |

Figure 2

PERSONALISING CONTENT PROVIDED TO A USER

CROSS-REFERENCE TO RELATED APPLICATIONS

This application is a continuation of U.S. application Ser. No. 10/536,297, filed May 25, 2005, which is a National Stage application of International Application No. PCT/IE2003/000153, filed Nov. 12, 2003, which claims the benefit of IE Application No. S2002/0908 filed on Nov. 27, 2002 the entire contents of which are incorporated herein by reference.

The present invention relates to a method, system and computer program product for personalising content provided to a user.

User's employing client devices such as those for browsing the World Wide Web or using WAP (Wireless Application Protocol) mobile phones or other Internet enabled devices find they have very different requirements depending on the environmental context in which they are accessing the information. In the present specification, environmental contexts are the circumstances that form the setting for a session of an interactive application, and these circumstances include context attributes such as time, day, location, agent, device, and so on—anything about the user's environment, even the weather.

For example, users of WAP/GPRS/3G mobile phones information needs at work may dramatically differ from when they are at home. Users might access different information based on the limitations of certain user agents, for example, using a mobile phone they might only access an information service, but from a PDA (Portable Digital Assistant) they might use a more interactive site. Users might access taxi information while in the city centre every Friday night. Thus, they might prefer taxi information to be higher up a content hierarchy then than if they were accessing it from a different location at the same time.

Traditionally, both customised and personalised systems do not take account of the user's moods or personalities during different browsing contexts. In the present document customisation means that a user manually gives information to a system about the user's preferences so that the system can adjust the output. Personalisation is the process of automatically learning about a user's preferences by analysing their interaction, and adjusting the output to the user's requirements without need for user input.

For example, ClixSmart™ Navigator Standard Edition v2.0 (henceforth referred to as Navigator) the relevant portions of which are described in PCT Application No. PCT/IE02/00059, discloses a personalisation engine which is responsive to a user request for content stored in a database and which extracts user's click information from a profile database to personalise the content delivered to the user. However, this is done regardless of the context in which the requests are made and this can diminish the overall effectiveness of such customized and personalized applications, in providing the right content to the user at the right time.

According to the present invention there is provided a method for personalising content provided to a user according to claim 1.

A preferred embodiment of the invention allows users who have different information needs over different environmental contexts to explicitly define personalities for each of these contexts. Another embodiment of the invention has the ability to automatically learn about the different personalities of users in different environmental contexts.

Embodiments of the invention will now be described with reference to the accompanying drawings, in which:

FIG. 2 illustrates the structure of personality information stored for a personality in a preferred embodiment of the invention;

Figure 1:
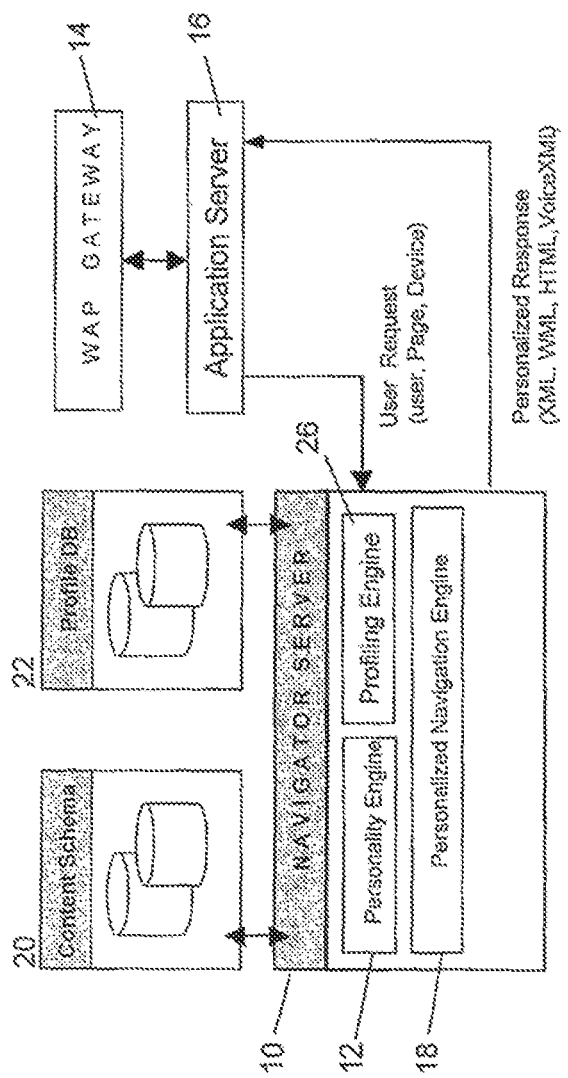
FIG. 1 illustrates components of a navigation system according to an embodiment of the invention implemented for a WAP gateway.

Referring now to FIG. 1, a navigator server 10 including a personality engine 12 according to a preferred embodiment of the present invention operates in conjunction with a WAP (Wireless Application Protocol) gateway 14. User requests for content received from mobile devices such as WAP phones are relayed from the WAP gateway 14 through an application server 16 to the navigator server 10. In this case, content delivered to the user comprises families of WAP menu items, for example, news, sport etc., within a menu hierarchy allowing the user to navigate to various WAP applications. When a user selects such an item from a menu, if the item is a branch node in the menu hierarchy, the user is offered another menu comprising a family of items. If the menu item is a leaf node in the menu hierarchy, the user will be directed to a WAP application such as an information service or a ticket booking service.

Where the invention is implemented in, for example, a web server, user requests received from web clients are received by the server and fed directly to a navigator server (possibly running on the same physical machine as the web server). In this case, the personalised content comprises web pages delivered to a web client. These pages include hyperlinks comprising URLs (Uniform Resource Locators) identifying respective linked web pages and it is these hyperlinks that are personalised using the present invention.

The invention may also be implemented as a navigator plug-in or module cooperable with an application running on a stand-alone device for example a desktop computer or a television set-top box. In this case, the invention is used to personalise the user interface menu items that are supplied to a user running the application.

In any case, the preferred embodiments of the invention described herein are based on the assumption that when requests for content are made, the navigator:

will have an indicator identifying a user (explicit personalities) or an indicator that no assumptions about user identity are to be made (implicit personalities);

will be provided with an indicator of the content required or selected by the user; and will be able to determine any required environmental context attribute values such as time, date, user device type, user location etc.

In the preferred embodiment, the request for content is fed to a personalised navigation engine 18 component of the navigator server 10. The personalisation engine 18 is used to retrieve content from a content database 20 and to personalise this content using information fed from the personality engine 12 before returning the personalised content to the application server 16 for delivery to the client via the gateway 14. In the sense that, given knowledge of the items in which a user has shown interest during recent sessions, it can provide personalised output, the personalisation engine can be regarded as equivalent to the personalisation engine described in PCT Application No. PCT/IE02/00059.

In the preferred embodiments, knowledge of the items in which a user has shown interest during recent sessions and during the current session is stored in a profile database 22.

Referring now to FIG. 2, personality information for each profiled personality which is stored within the profile database 22 comprises one or more personality files 24, 24', 24" each associated with a context attribute. Each personality file stores a plurality of item identifiers each with an associated hit table. Each hit table comprises a plurality of hit values.

In the case of personality file 24 for context attribute #1, the file could comprise information associated with time. Here, the hit table could comprise a set of value attributes V1 ... Vn, each corresponding to say hourly time slots within a day. Context attribute #2 may, for example, be associated with location and each of the value attributes V1 ... Vm in the personality file 24' might correspond with actual locations. Finally, context attribute #3 may, for example, be associated with the client device type and each of the value attributes V1 ... V2 in the personality file 24" might correspond with device types like PDA, WAP phone or desktop.

The following is an example of an equivalent set of personality files, in XML format, for time, location and agent context attributes for a set of menu items:

```
<personality-files>
  <context-name="time">
    <item id="news">     // this would probably not be name of
                         // item but the unique id for the item
      <context-hit context-val="9" hit-val="1"/>   // defines a
                                                    // context matrix
      <context-hit context-val="10" hit-val="3"/>
      ............
    </item>
    <item id="sport">
      ............
    </item>
    ............
  </context>
  <context name="location">
    <item id="news">     // this would probably not be name of
                         // item but the unique id for the item
      <context-hit context-val="dublin" hit-val="1"/>
      <context-hit context-val="cork" hit-val="3"/>
      ............
    </item>
    ............
  </context>
  <context name="agent">
    <item id="news">     // this would probably not be name of
                         // item but the unique id for the item
      <context-hit context-val="pda" hit-val="2"/>
      <context-hit context-val="mobile" hit-val="3"/>
      ............
    </item>
    ............
  </context>
  ............
</personality-files>
```

Manipulating personality information in XML format can enable the invention to be deployed more flexibly, although it will be seen that the invention is not limited to any particular storage schema or system for personality information.

In either case, there are two phases of access to the personality information. The first takes place in response to the user request for content. In this first phase, the personalisation engine 18 requests hit values for each of the items comprising the content requested by the user by providing the personality engine 12 with appropriate item identifier(s). The personality engine 12 also gets details describing the current environmental context either as part of the request sent by the personalisation engine 18, e.g. User ID or location, or by determining these itself, e.g. time.

When content including an item is first requested by a user, the personality engine 12 creates an item object including a hit table in each personality file. The hit table maps an environmental context attribute value onto a hits value for an item. See, for example, Table 1.

TABLE 1

| | (hour) | | | | | | | | | | | | | |
|---|---|---|---|---|---|---|---|---|---|---|---|---|---|---|
| | 9 | 10 | 11 | 12 | 13 | 14 | 15 | 16 | 17 | 18 | 19 | 20 | 21 | 22 |
| News | 1 | 3 | 3 | 1 | 0 | 0 | 1 | 7 | 5 | 0 | 0 | 0 | 0 | 0 |

Here, if a user requests content containing the item "News" at 4 pm, a Time context attribute value would be 7 and this context-weighted hits value could be returned by the personality engine 12 to the personalisation engine 18 to allow the content to be personalised accordingly. As will be explained in more detail later, more sophisticated processing of the hit table information can be performed by the personality engine before passing the results to the personalisation engine. In general, this comprises generating a probability value for the environmental context in which an item is accessed from the hit values representing the level of interest that the user has shown in a particular item under a particular context attribute value.

The second phase of access takes place after a user selects an item from the content returned by the personalisation engine 18 to the user. Here, every personality file, corresponding with an attribute of the environmental context, is updated by getting the environmental context attribute value(s) and the item requested and incrementing the appropriate hit value by a confidence score. In the preferred embodiment, a separate table (not shown) containing a total of all hits for an item may also be maintained and, when an item is selected, this is incremented so as to provide an easy indicator of the total level of interest in an item.

In a first embodiment of the invention, the personality engine 12 employs personalities explicitly defined by a user to personalise content. In this embodiment, a user, again via the gateway 14 and application server 16 or by any other access medium sends requests to a profiling engine 26 to define one or more explicit personalities.

Figure 3:
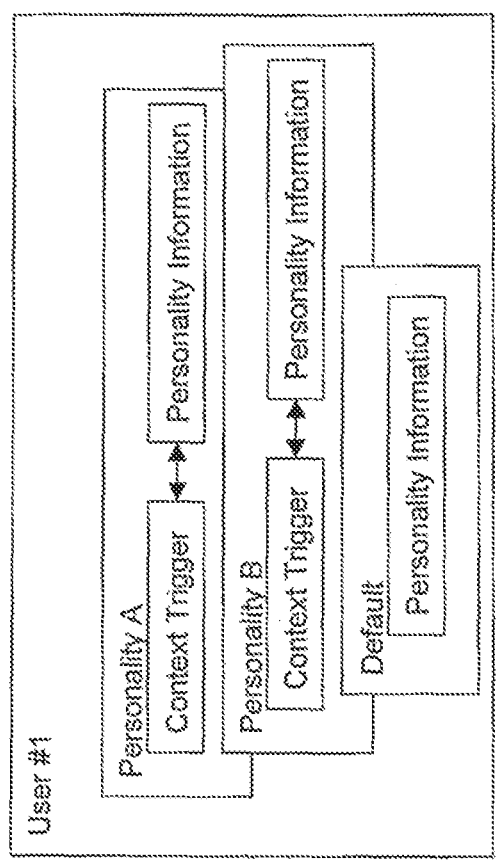
FIG. 3 illustrates explicit personalities stored for a user using the personality information structure of FIG. 2.

Referring to FIG. 3, the personality files for each explicit personality are associated with an associated context trigger, which is defined by the user through the profiling engine. Context triggers are various pieces of information associated with a personality that activate it for personalizing during a user's online session.

When a user issues a request for a session, certain environmental context attributes are also made available along with it, such as the time of the request, the user agent issuing the request, and the location the request is being made from.

In the preferred embodiment, information contained in a user's context-trigger(s) is used to activate one explicit personality for profiling for a current set of environmental context attributes. Any clicks during this session are recorded under the currently activated personality by associating the clicks with the active personality and saving the information in the associated personality file. This allows the system to create a personalized menu structure for each personality for each of the client device's users.

Using the present invention, this means that a user can define a plurality of explicit personalities, and that the user's menu structures can have a different focus for each explicit personality. Each of those menu structures is arranged according to the information accessed when the personality was activated or the menu structure can be generated based solely on items recommendable for that personality.

Also, in the case of multiple users using the same device such as a workstation or mobile phone, each user can create one or more personalities for themselves, which they activate or are activated automatically when they log on to the device.

So, in a typical WAP phone example, a user, John, defines three distinct personalities, a morning personality, a daytime personality, and an evening personality:

Through interaction with the profiling engine 26, John defines an explicit morning personality for the period 7:00 am to 9:30 am. Thus, he will specify a context trigger setting these values for the environmental context attribute time. In the morning he is interested in the weather as well as finding out about technology news and what he might have for lunch, and so the personalisation engine should tend to learn and provide these preferences for this period.

John defines a daytime personality for the period 9:30 am to 5:30 pm. During the day, John's mind starts to consider his after-work activities, so the personalisation engine might tend to learn and suggest information such as sailing info, what TV programmes are on that night and music downloads for his journey home.

Finally, John defines an evening personality (from 5:30 pm until 11:00 pm) so that the personalisation engine might begin to learn and suggests the kinds of programmes he might watch, restaurant deals, and cinema times.

The remaining time periods in the week are covered by a default personality which can either be a nominated one of the above personalities or it can be a separate personality which will not need a context trigger as shown in FIG. 3.

When a user logs on, either the user manually specifies the personality they wish to use, or else the profiling system 26 uses the context triggers associated with their personality file(s) and the environmental context information at the time of the request to automatically work out which personality should be emphasized during this session. If none of their personalities are compatible with the current environmental context—according to their trigger information—then the default personality is used for profiling.

In either the manual or automatic case, the preferred embodiment is based on the assumption that the user has been identified by the system and the set of personalities for the user is available to the system. Thus, if a user connected to the Internet via their WAP phone or from a desktop computer through a landline, their ISP (Internet Service Provider) would be able to make recommendations to the user based on their accessing device type, if their personality information were accessible to both portal operators. If an application were only accessed through a single device type, then clearly this would not be employed as a context attribute for personalisation.

As with the personality files, the various context triggers can be stored in flat file format, XML format or any other suitable format. A trigger entity can be based on any environmental context attribute, for example, time-based, location-based or agent-based—it specifies the conditions under which this personality should be activated.

The following XML definition explains how data can be stored for explicit personalities, where the context trigger attributes are time and day of the week:

```
<personality>
    <name>work</name>
```

-continued

```
<trigger>
    <day>
        <from> Monday </from>
        <to> Friday </to>
    </day>
    <time>
        <from> 09.00 </from>
        <to> 17.00 </to>
    </time>
</trigger>
</personality>
```

In addition or as an alternative to explicit personalities, in a second embodiment of the invention, the personality engine 12 automatically learns the personalities and context triggers for each user. In general, the implicit personalities component of the personality engine 12 automatically learns the different personalities of one or more users who may display differing behaviour patterns in different environmental contexts. Implicit personalities are more powerful than explicit personalities as they can detect discrete changes in the user's activity for different environmental contexts.

Unlike explicit personalities, here the user(s) do not have to define personalities by manually setting up triggers and neither do they have to enable personalities. Instead, a single set of implicit personality files are maintained for any users for whom the navigator is providing personalised content, and these are used by the personality engine 12 to detect discrete changes in user activities as environmental contexts change.

As in the case of the explicit personality files, FIG. 2, the implicit personality files comprise a number of context attribute tables 24, 24', 24"—one for each relevant context attribute. Each table maps item and context attribute values to a hit value representing the relevance of an item to an environmental context attribute value.

Consider the following examples where implicit personalisation may be useful:

EXAMPLE #1

A set-top box contains content comprising TV listings—this information may be downloaded from a central source via a cable connection or an Internet connection. The set-top box is controlled by a remote control handset freely usable by a number of users. The navigation server is implemented on the set-top box in conjunction with an application which delivers TV listings menus and choices to users either on the television screen or on the remote control handset. One user watches Rugrats and Spiderman regularly from 7:30 until 9:00 am every Saturday. From 2 to 4 pm, another personality watches football and checks the racing results on teletext. Another personality watches Buffy at 6:00 pm until 7:00 pm, and then the news on a different station. Another personality regularly watches a movie between 8:00 pm and 10:30 pm. In this case, the environment is defined primarily by the context attributes time and day of the week and two such personality files having appropriate hit table attribute values would be defined as implicit personality information.

EXAMPLE #2

John has a mobile phone and he doesn't want to define explicit personalities. However, he would like to receive from a WAP portal the most relevant information based on his current situation. His environment can be defined by a number of context attributes—in this example, his location, device, and current time. The mobile phone has a unique identifier called an MSISDN number. When John accesses a particular WAP service, his MSISDN number is passed from the WAP gateway to the navigator server. The server pulls up the user's implicit personality files, without any need for the user to log on, using the MSISDN as an identifier. (It will be seen that in this case, no attempt is made to distinguish between different users using the same phone—where their use in different environmental contexts differs, then implicit personalisation may distinguish between them, however, if their different use overlaps in the same environmental contexts, implicit personalisation will tend to blend their personalities.)

In both examples, the navigator server extrapolates any other context attribute values (time and location) from the user request and these environmental context values are mapped against context attribute values for items stored in the user's implicit personality files.

Thus, without any other external prompting, the personality engine 12 can deal with the usage patterns for the particular contexts, and the personalisation engine 18 can adjust the displayed menu options accordingly.

The following describe the functionality of the explicit and implicit personalisation in terms of the embodiment of FIG. 1 in more detail.

Figure 4:
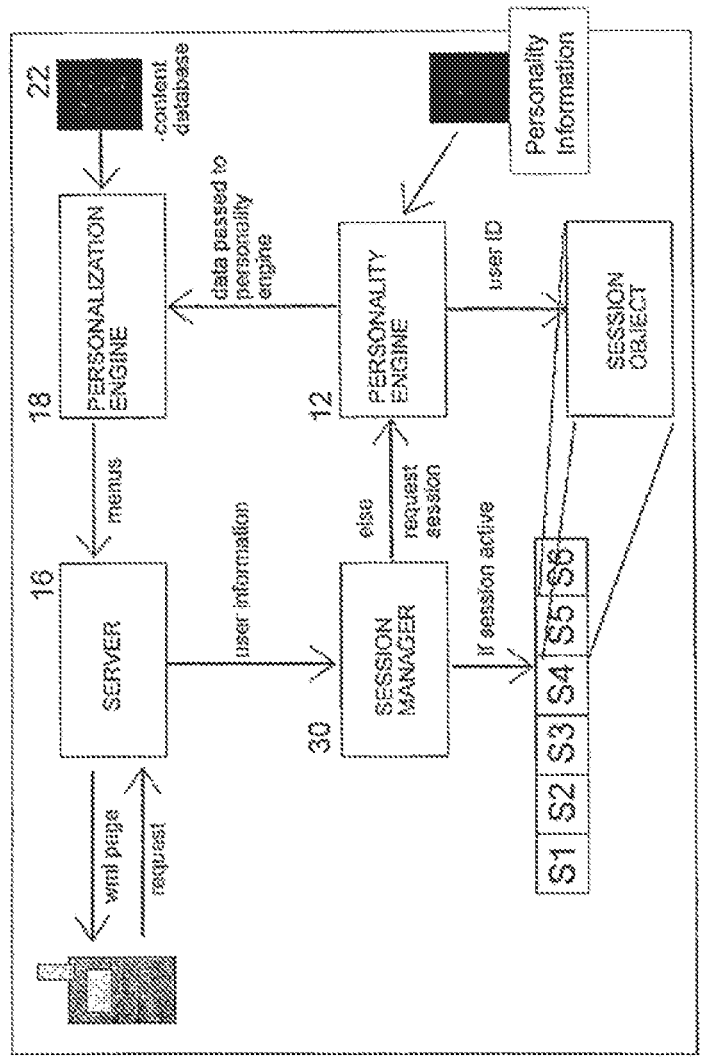
FIG. 4 shows the steps involved in the operation of the navigator server of FIG. 1.

Referring to FIG. 4, a WAP phone user connects to the WAP gateway with their mobile phone. The request for content is sent to the application server 16. The application server then requests a session from a session manager 30. For explicit personalisation, the session manager needs to identify the user and in this case, the user ID is extracted from the MSISDN.

The session manager 30 checks to see if the user has an active session by querying any session objects S1 . . . S6 with the user ID. If the user does have an active session, the session manager routes the request to a session object which contains the information from the current session about the user's interaction. If the user does not have an open session, the session manager 30 generates a new session object and the user ID is passed to the session object.

For explicit personalisation, on creation, a session object looks through the personality information in the profile database and selects the personality information for the user whose ID matches the ID stored in the session object. Once located, the personality information stored in the appropriate XML file(s) is loaded into the session object. Then environmental context information for the request is passed into or determined by the session object. The session object compares this environmental context information with the information stored in the user's context triggers. In the preferred embodiment, the personality which most closely matches the context trigger information is selected from the user's defined personalities and the personality files for this personality are used thereafter.

For implicit personalisation, the session manager only needs to establish a User ID if it is handling requests from many users at the same time and needs to track their interaction separately by employing separate session objects for each user. This also helps to regulate the two-phase read-write access to the personality files, as ultimately, for implicit personalisation, interaction for all users is recorded in the same set of personality files.

Once a newly created session object has determined which explicit personality to use, the operation of the session object is the same each time the session object for the user is called.

The application server 16 interacts with the session objects in two modes. The first mode relates to the first phase of access to the information in the personality files. In this first mode, the application server 16 requests personalisation information relating to identified items. Thus, when a menu item has been selected by a WAP phone user, the application server 16 will determine from this selection, the child items of the menu item, and request the personalisation information associated with these child items from the appropriate session object. The second mode relates to the second phase of information access where the application server 16 indicates to the appropriate session object that a particular item has been selected by a user, and that the context attribute values for that item need to be updated.

In practice two such calls on the session object may be made by the application server in parallel, i.e. to indicate that a parent item has been selected and to request first phase information for its child items. However, for clarity, first phase access for a given item will be described before second phase access.

In the preferred embodiment, the session object in conjunction with the personality engine 12, queries the personality files for each item of the content requested to generate a hit table for each context attribute, i.e. all hit values for each context attribute are returned for each item. The hit tables are then processed by the personality engine 12 using a mathematical function that processes the information for each context value. The processed information is then forwarded to the personalization engine 18 which provides the appropriate menu items based on the information sent by the personality engine to the user.

For implicit personalisation, the personality engine 12 could be implemented without using session objects by simply extracting hit table information for items based on the environmental context pertaining at the time of the request for the items from the application server. The personality engine 12 can then process these hit tables using the same mathematical function as for explicit personalities.

The following formulae show one possible mathematical function used for processing hit tables to compute a probability score for an item.

Total Hits H for item m for a context attribute c:

$$H(m, c) = \sum_{x=1}^{n} h(m, c_x)$$

where m∈M, where M is the set of items;
where c∈C is the set of context attributes—each associated with a personality file;
where $c_x$ is the context value of context attribute c and $h(m,c_x)$ is the hits value associated
with m for the context attribute value $c_x$; and
where n is the total number of context values.

Average hits Av for item m for context attribute c:

$$Av(h(m,c)) = (H(m,c))/n$$

Context weight Cw for item m given current environmental context value $c_t$:

$$Cw(m, c_t) = \begin{cases} 0 & h(m, c_t) \leq Av(h(m, c)) \\ & \text{where} \\ h(m, c_t)/H(m, c) & h(m, c_t) \geq Av(h(m, c)) \end{cases}$$

So, where $h(m, c_t)$—the hits value for an item for a given context attribute for a given environmental value of the context attribute—exceeds the average hits for the item across all attribute values, the context weight is this hits value divided by the total hits H(m,c) for the item m for the context attribute c. Otherwise the hits value is taken as 0.

Probability Score S for an item in a given environmental context:

$$S(m) = H(m) + \sum_{c=1}^{N} (Cw[e](m, c[e]_t) * H(m))$$

where N is the total number of context attributes—personality files; and where H(m) is the total hits value for an item either derived from the personality files 24 or stored in a separate table.

This form of probability score takes into account both the users general interest in an item across all environmental contexts H(m) as well as the particular interest of the user in an item for a given environmental context. It is appreciated that the value of S may be greater than 1 and if required this may be normalised to produce a more formal probability score of between 0 and 1.

To explain the above function by way of example, consider a time-based context attribute having a hit table of the type shown in Table 1. In this case, hit values have been associated with an hour of the day when the item "News" was requested during the 14-hour period from 9 am.

This table is used to generate a context weight or probability value for each item that a user has selected as follows. The total hits (H) for this item (News) is 21 clicks and the Average clicks per period is 21/14=1.5.

If a user starts a session at time 17:05, the system then calculates a probability score for that item as follows:

Context Weight(News,17)=5/21=0.23

S(News)=21+0.23*21=26

Alternatively, if they access the item at 14:30, then the probability score would be:

Context Weight(News,14)=0

S(News)=21+0*21=21

So, while a number of possible metrics could be used to generate S(m), in the example above a relatively simple approach is taken. Nonetheless, it will be seen that other more sophisticated metrics could be used in generating a probability score for an item from the context information available.

Having determined the probability scores for any items in the content originally requested by the user, the personality engine 12 provides the scores to the personalisation engine 18, FIG. 4.

The personalization engine 18 uses this information from the personality engine 12 to order menu items outputted to the user's WAP phone. Thus the menu is forwarded from the server to the user as a WML page.

Once the user has the WAP page, they begin to interact with the menu items. The user selects an item from the menu and this information is returned to the server 16 as another request for content. Now using second phase access, the server 16 passes the user information, the ID of the item selected and the context information to the session object via the session manager which selects the appropriate session based on the user ID. The session object processes the information and updates the hit table. For each attribute table, the hit value for the selected item is incremented. The updated table values can be used in subsequent requests otherwise the changes they imply will only come into effect in the next session. Depending on the sensitivity of the navigator, this may or may not affect the output of the menu structure sent as a WML page to the user.

Finally, at the end of the session, the session manager 16 tells the session object that the user has ended the session and the session object updates the various personality files for the user by turning the session object information (soft storage) into XML personality files (hard storage) to be called at the beginning of the user's next session.

In the preferred embodiments described above only one explicit personality was described as being active for any given session with the session object deciding according to the environmental context of the initial request. However, it may also be useful for more than one explicit personality to be activated at the same time, i.e. context triggers can be used in combinations to activate multiple personalities. So, for example, where a user had defined one explicit personality to trigger for a given device type and another explicit personality to trigger during a given time period, if the user initiates a session with the device type and during the time period, both personalities might be activated, each with a given weighting. The calculations described above to generate probability values could be performed for both sets of personality files and then blended using the weightings to provide a single probability value. Updates fed back to the personality files could also be fractionalised according to the weightings. This could lead to menu structures being generated based on a combination of the user's personalities, with the multiple personalities having different emphasis or weighting.

The invention claimed is:

1. A method for personalizing user content, comprising:
   determining one or more environmental context attribute values for a session of an interactive application, where the one or more environmental context attribute values include one or more attributes of the user's environment during the session of the interactive application;
   in response to a request for a specific type of content by the user, wherein the specific type of content comprises a plurality of wireless application protocol (WAP) menu items, web pages, a plurality of desktop computer user interface menu items and a plurality of television set-top box user interface menu items, for each of a plurality of items matching the specific type of content, mapping in a first hit table each of the one or more environmental context attribute values to respective values indicating the user's level of interest in the item in association with each of the environmental context attribute values;
   retrieving the plurality of items of the specific type of content from a content database;
   personalizing the plurality of items of the specific type of content utilizing a hardware processor, including ordering the plurality of items of the specific type of content as a function of the user's level of interest in each of the plurality of items in association with the one or more environmental context attribute values retrieved from the first hit table;
   returning the personalized plurality of items of the specific type of content to the interactive application so that the specific type of content is personalized for each of the different environmental contexts;
   identifying a selection by the user of at least one of the plurality of items of the specific type of content through interaction with the interactive application; and in response to the identification of the selection by the user:
determining one of the environmental context attribute values that is associated with the selection of the specific type of content by the user,
incrementing by a confidence score a hit value mapped to the determined environmental context attribute within the first hit table, where the hit value indicates the user's level of interest in the at least one of the selected items of the specific type of content in association with the determined environmental context attribute, and
incrementing a total value associated with the at least one of the selected items of the specific type of content within a second hit table separate from the first hit table, where the total value indicates a total of all hit values within the first hit table for the at least one of the selected items of the specific type of content.

2. A system for personalizing user content, comprising:
a processor for:
determining one or more environmental context attribute values for a session of an interactive application, where the one or more environmental context attribute values include one or more attributes of the user's environment during the session of the interactive application;
in response to a request for a specific type of content by the user, wherein the specific type of content comprises a plurality of wireless application protocol (WAP) menu items, web pages, a plurality of desktop computer user interface menu items and a plurality of television set-top box user interface menu items, for each of a plurality of items matching the specific type of content, mapping in a first hit table each of the one or more environmental context attribute values to respective values indicating the user's level of interest in the item in association with each of the environmental context attribute values;
retrieving the plurality of items of the specific type of content from a content database;
personalizing the plurality of items of the specific type of content including ordering the plurality of items of the specific type of content as a function of the user's level of interest in each of the plurality of items in association with the one or more environmental context attribute values retrieved from the first hit table;
returning the personalized plurality of items of the specific type of content to the interactive application so that the specific type of content is personalized for each of the different environmental contexts;
identifying a selection by the user of at least one of the plurality of items of the specific type of content through interaction with the interactive application; and
in response to the identification of the selection by the user:
determining one of the environmental context attribute values that is associated with the selection of the specific type of content by the user,
incrementing by a confidence score a hit value mapped to the determined environmental context attribute within the first hit table, where the hit value indicates the user's level of interest in the at least one of the selected items of the specific type of content in association with the determined environmental context attribute, and
incrementing a total value associated with the at least one of the selected items of the specific type of content within a second hit table separate from the first hit table, where the total value indicates a total of all hit values within the first hit table for the at least one of the selected items of the specific type of content.

3. A system as claimed in claim 2 further comprising: defining an explicit set of personalities associated with the user, each personality associated with a context trigger and each context trigger comprising one or more user defined attribute values; and in response to one of the context triggers' attribute values matching the one or more environmental context attribute values for the session for activating the personality associated with the context trigger for the session.

4. The system of claim 3, wherein the activating is responsive to more than one of the context triggers' attribute values matching the one or more environmental context attribute values for the session for activating each personality associated with the matching context triggers for the session.

5. A system of claim 4, wherein the activating is responsive to none of the context triggers' attribute values matching the one or more environmental context attribute values for the session for activating a default personality for the session.

6. A system of claim 5, wherein the updating is arranged to update the values associated with any activated personality.

7. A system of claim 2, wherein the mapping is responsive to requests for the specific type of content from any users for mapping each of said one or more environmental context attribute values for at least one item of the specific type of content to a common set of values indicating users' level of interest in the at least one item for the environmental context attribute values.

8. A system of claim 2, further comprising an application server arranged to receive user requests from a WAP gateway, the application server being arranged to provide the system with the request for the specific type of content and the system being arranged to return the personalized specific type of content to the application server, the specific type of content comprising WAP menu items.

9. A system of claim 2, further comprising a web server arranged to receive requests from Internet clients, the web server being arranged to provide the system with the request for the specific type of content and the system being arranged to return the personalized specific type of content to said web server, the specific type of content comprising personalized web pages including hyperlinks to linked pages.

10. A system of claim 2, wherein the system is implemented within a set-top box to generate the user requests for the specific type of content and the system returning said personalized the specific type of content to a set-top box application for display to the user, the specific type of content comprising personalized TV listings.

* * * * *